No. 874,898. PATENTED DEC. 24, 1907.
T. M. MORRIS.
AUTOMATIC STARTING BOX.
APPLICATION FILED MAY 3, 1907.

3 SHEETS—SHEET 1.

No. 874,898. PATENTED DEC. 24, 1907.
T. M. MORRIS.
AUTOMATIC STARTING BOX.
APPLICATION FILED MAY 3, 1907.

3 SHEETS—SHEET 3.

UNITED STATES PATENT OFFICE.

THOMAS MARION MORRIS, OF NEW HAVEN, CONNECTICUT, ASSIGNOR OF ONE-FOURTH TO FREDERICK P. LEWIS AND ONE-FOURTH TO EDWARD H. EVERIT, BOTH OF NEW HAVEN, CONNECTICUT.

AUTOMATIC STARTING-BOX.

No. 874,898.

Specification of Letters Patent.

Patented Dec. 24, 1907.

Application filed May 3, 1907. Serial No. 371,593.

*To all whom it may concern:*

Be it known that I, THOMAS MARION MORRIS, a citizen of the United States, residing at New Haven, in the county of New Haven and State of Connecticut, have invented a new and useful Improvement in Automatic Starting-Boxes; and I do hereby declare the following, when taken in connection with the accompanying drawings and the letters of reference marked thereon, to be a full, clear, and exact description of the same, and which said drawings constitute part of this specification, and represent, in—

Figure 1:
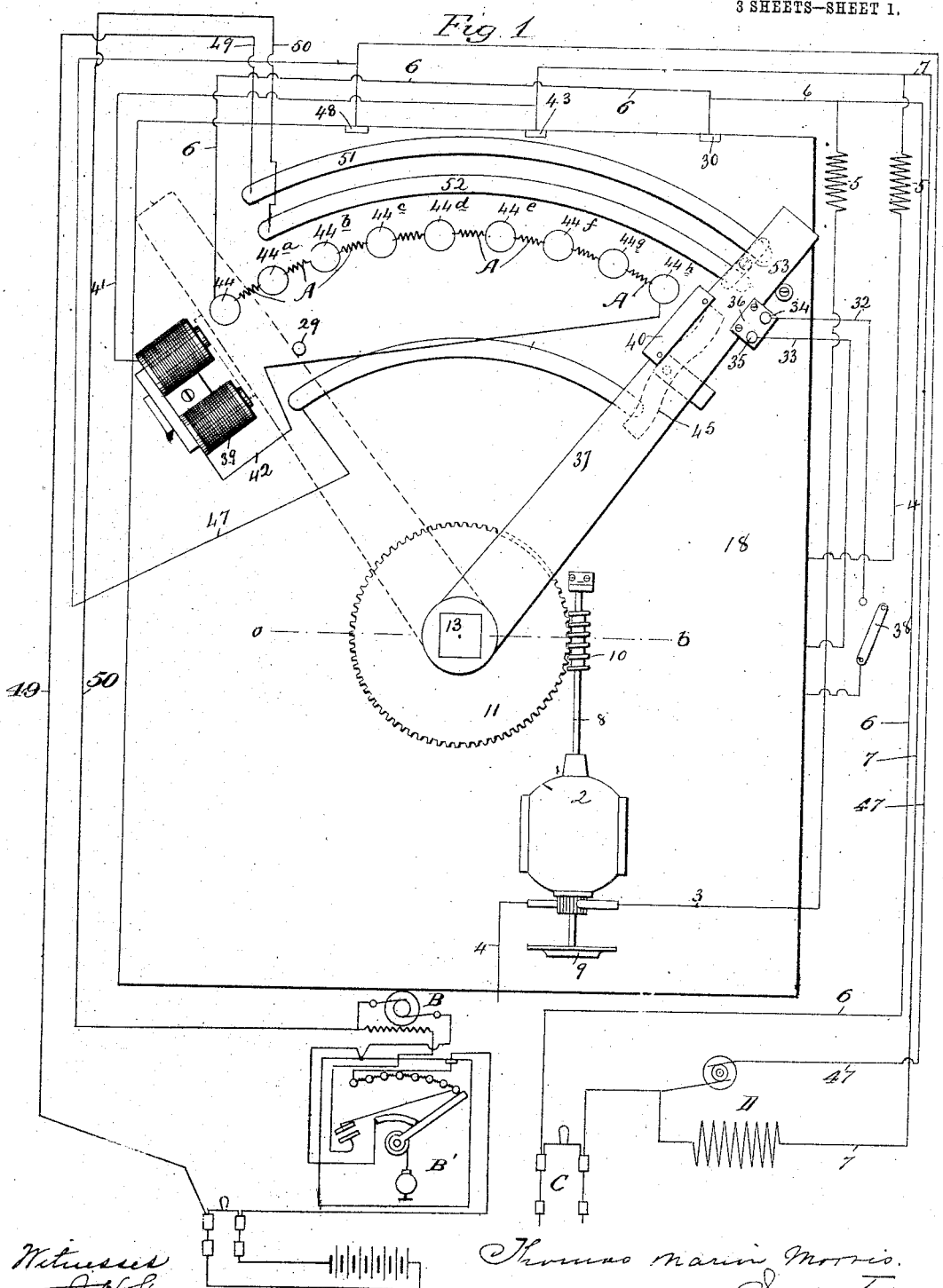
Figure 2:
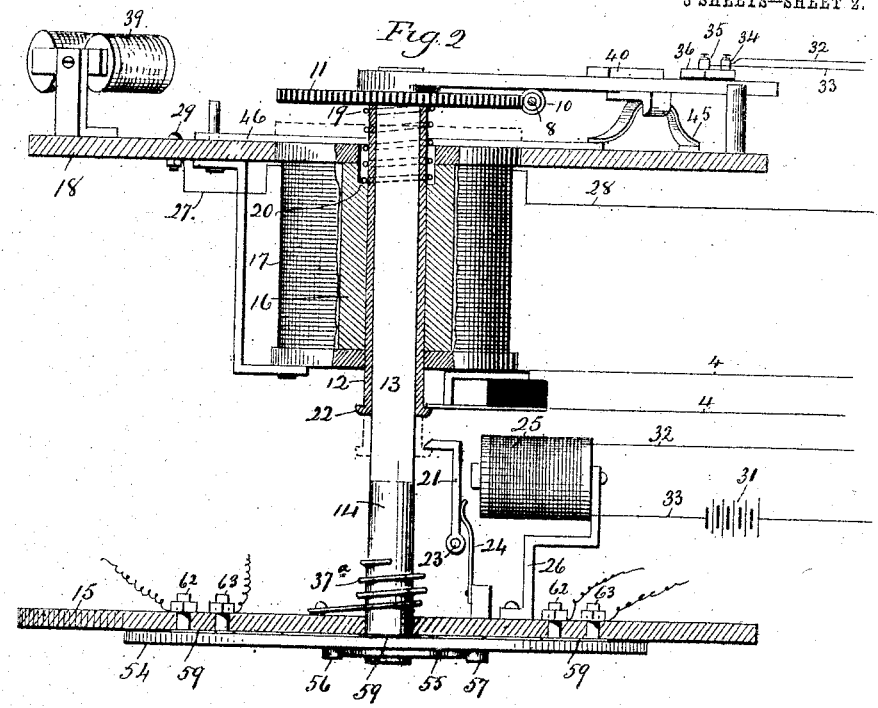
Figure 3:
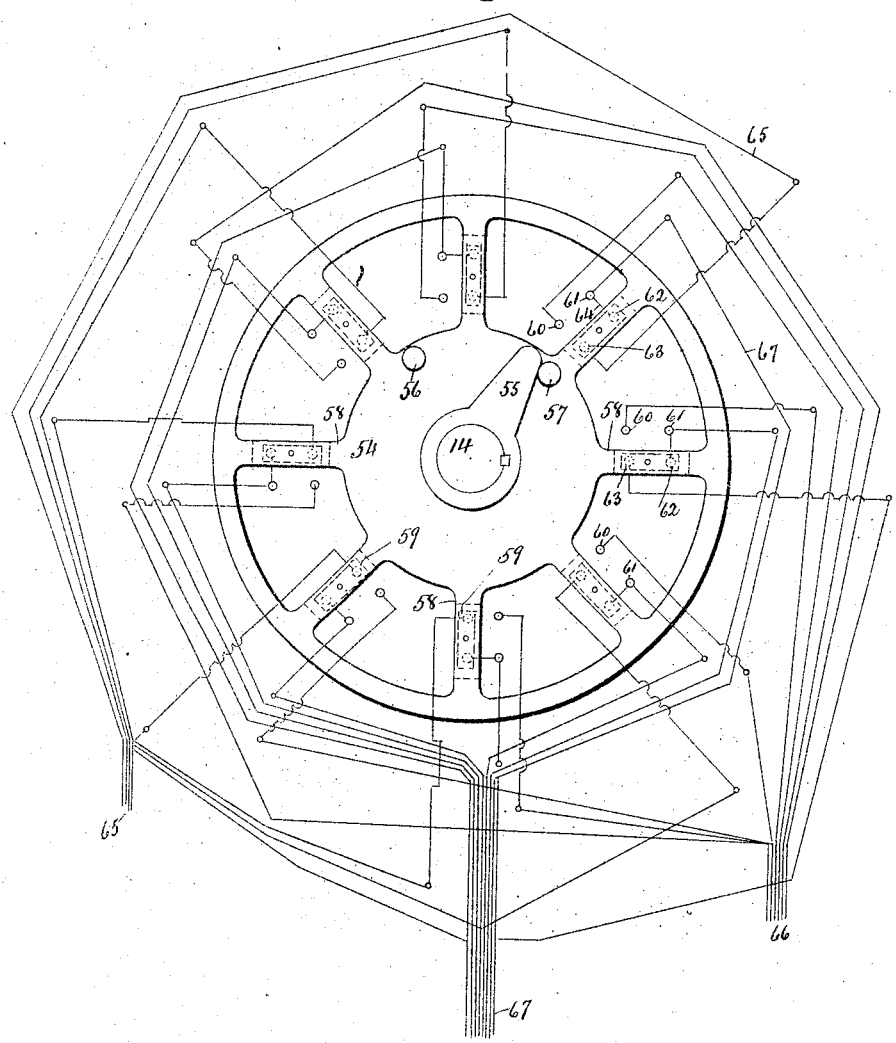

Figure 1 a view in rear elevation of an automatic starting box constructed in accordance with my invention. Fig. 2 a view in horizontal section on the line *a—b* of Fig. 1 and looking upward. Fig. 3 a view in front elevation showing the wheel switch.

My invention relates to an improvement in automatic starting boxes designed with particular reference for use with telephone ringing machines but capable of being used in any situation where electric motors are used, the general object being to automatically start the power motor in case the same is stopped by a temporary interruption of the current thereto.

When my improved starting box is used in conjunction with a telephone ringing machine, the specific object is to automatically start the emergency machine at any time that the current to the power machine is interrupted and to automatically stop the emergency machine and start the power machine when the current again reappears on the power main.

With these ends in view, my invention consists in an automatic starting box having certain details of construction and combinations of parts as will be hereinafter described and pointed out in the claims.

In carrying out my invention as herein shown, I employ a pilot motor 2 of any approved construction, connected by leads 3 and 4 through resistance coils 5, 5, to the leads 6 and 7 of the main line. The said lead 6 goes direct to one side of the main line switch C while the said lead 7 goes through the field coil of the power machine D to the other side of the main line switch C aforesaid. The power machine D it may here be said, is of any approved construction for telephone ringing machines. Its shaft 8 is furnished at its lower end with an end-thrust bearing 9 and has at its upper end a worm gear 10 co-acting with a large gear wheel 11 mounted upon the projecting rear end of a longitudinally movable tube 12 having a square longitudinal opening adapting it to fit over the square rear portion 13 of a rock shaft 14 the front end of which is journaled in the front plate 15 of the rheostat, while its rear end bears in the said tube 12 which is free to rock as well as to slide in the core 16 of a large circular magnet 17 secured to the rear plate 18 of the rheostat and extending rearward through the same sufficiently to act upon the said gear wheel 11 so as to draw the same forward to disengage it from the worm gear 10 at which time the tube 12 is caused to slide forward on the square portion 13 of the rock shaft 14. On account of the function just referred to, I shall hereafter, for convenience, call the magnet 17, the "gear disengaging magnet".

A coiled spring 19 encircling the rear end of the tube 12 is interposed between the inner face of the gear 11 and a shoulder 20 within the core 16 and provides for pushing the gear 11 rearward so as to reëngage it with the worm gear 10 when the circuit through the magnet 17 is broken and when the said tube 12 is released for such rearward sliding movement by the disengagement from the flange 22 at its extreme forward end of a hook-like armature 21 hung upon a stud 23, engaged with the said flange 22 by a spring 24 and disengaged therefrom by a small tripping magnet 25 carried by a bracket 26 attached to the inner face of the front plate 15 which, as well as the plate 18, consists of a slab of slate or other similar material.

The gear-disengaging magnet has two leads 27 and 28, the former leading to a button 29 upon the rear face of the plate 18 and the latter to the line-terminal 30 on the starting box, the magnet being energized only when the telephone ringing machine is running. The tripping magnet 25 is operated by a local battery 31 the leads 32 and 33 of which terminate through the local battery 31 in buttons 34 and 35 through which the circuit is completed by a small yielding copper contact plate 36 carried by and insulated from the rock arm 37, the "movable arm", so called, of the rheostat.

When the telephone ringing machine is not running and the arm 37 is in its "dead" position in which it is shown by full lines in Fig. 1, the plate 36 closes the circuit through the local battery leads 32 and 33, whereby the magnet 25 is energized for operating the armature 21 in releasing the tube 12 to the action of the spring 19 which pushes the tube rearward so as to reëngage the gear 11 with the worm gear 10. In the circuit of the leads 32 and 33, I locate a small switch 38 for the purpose of opening the local battery circuit 31 in the event of discontinuing the use of the machine for any length of time.

The rock arm 37 is mounted upon the projecting rear end of the squared portion 13 of the rock shaft 14 and when the telephone ringing machine is running, is held in its running position in which it is shown by broken lines in Fig. 1, by means of a releasing magnet 39 mounted upon the rear face of the rear plate 18 and acting upon a small armature 40 loosely mounted upon one edge of the arm 37 in the usual manner. The said releasing magnet 39 has two leads 41 and 42, the former terminating at the shunt field terminal 43 and the latter terminating in the extreme left hand resistance button 44 which in turn is connected through the ordinary resistances A, with a series of buttons $44^a$, $44^b$, $44^c$, $44^d$, $44^e$, $44^f$, $44^g$ and $44^h$. This resistance circuit controlling the amount of current entering the armature of the power machine D is, however, open until the arm 37 has moved sufficiently from right to left to bring the sliding contact plate 45 carried by it into engagement with the adjacent button $44^h$, the said plate 45 being also engaged at the same moment with a segmental contact strip 46 mounted upon the rear face of the plate 18 and connected by a lead 47 with the armature terminal 48.

The emergency motor B, which may be of any approved construction, is connected by leads 49 and 50 with a pair of segmental contact-strips 51 and 52 located upon the back of the plate 18 above the series of resistance buttons specified. These strips I shall hereafter speak of, for convenience, as the "emergency motor contact strips"

When the power machine is running and the arm 37 is in its normal or running position, the emergency motor circuit is open. The moment, however, the circuit is broken through the release magnet 39 so as to release the arm 37, the emergency motor circuit is closed by the engagement of the adjacent ends of the strips 51 and 52 by a sliding contact plate 53 carried by the arm and insulated therefrom. As the arm swings from left to right the plate 53 rides over the strips 51 and 52, maintaining a circuit through the emergency motor. I may explain in this connection that the emergency motor itself is provided with a rheostat B' precisely the same in all respects as that which I am now describing, with the single exception that the emergency motor contact strips 51 and 52 are omitted. This rheostat B' is diagrammatically shown in miniature on Fig. 1. These strips are constructed to extend virtually between the running and dead positions of the arm 37 so that the emergency motor circuit may be closed and broken close to the running position of the arm 37, whereby opportunity is given to the emergency motor to reach its full speed every time its current is broken as would not be the case if the strips 51 and 52 were made short in which case the arm in the emergency motor machine corresponding to the arm 37, might be stopped in some intermediate position in which case a portion of the resistance coils would be cut out of the emergency motor circuit which might injure the emergency machine. This contingency I avoid by making the strips 51 and 52 long, as shown.

Some provision must be made for leading the secondary currents to the switch board from whichever machine is being used;— that is to say, to lead the secondary currents from the power machine to the switch board when the power machine is being used and to lead the secondary currents from the emergency motor to the switch board when the emergency motor is being used. For this purpose I provide an oscillating switch-wheel 54 (Fig. 3) automatically controlled by the working of the rheostat located in front of the front plate 15 and mounted upon the projecting forward end of the rock-shaft 14 so as to be turned thereupon independently thereof by means of a short rock arm 55 keyed upon the projecting forward end of the shaft and arranged to alternately engage operating studs 56 and 57 carried by the wheel which is furnished with radial arms 58 the number of which will vary according to circumstances. Each arm 58 carries an insulated contact-plate 59 arranged for engagement with two power machine buttons 60 and 61 closing the secondary power leads and two emergency motor buttons 62 and 63 closing the emergency motor leads, these buttons being mounted in the plate 15. The buttons 61 and 62 of each group of four are connected by a short cross connection 64 and lead to the switch board; the button 60 of each group leads to the secondary side of the power machine, while the button 63 of each group leads to the secondary side of the emergency machine. As shown in Fig. 3 of the drawings, the switch wheel 54 is in position for the use of the emergency machine, the contact plates 59 closing the circuits between the buttons 62 and 63, putting all of the secondary emergency leads 65 into the switch board. Now when the power machine starts, the rock-shaft 14 will rock from right to left causing the arm 55 to move away from the stud 57 but without disturbing the switch wheel 54 until the arm has nearly reached the limit of its movement from right to left when it engages with the stud 56 and moves the switch wheel 54 just enough from right to left to cause all of the contact plates 59 to move from their engagement with the buttons 62 and 63 into engagement with the buttons 60 and 61, whereby all of the secondary leads from the emergency machine to the switch board are broken and all of the secondary leads from the power machine to the switch board are closed, changing the secondary leads from one machine to the other. When the plates 59 are engaged with the buttons 60 and 61 the current will flow from the power machine through the leads 66 to the buttons 60, thence through the plates 59 to the buttons 61, and thence through the leads 67 to the switch board.

Having now described my improvement in detail, I will briefly set forth the mode of its operation.

Let it be supposed, for instance, that for some reason or other (it does not matter what), the main line circuit is interrupted, stopping the telephone ringing machine and demagnetizing the release magnet 39 and allowing the arm 37 to be moved by its spring 37ª from its running or normal position at the left to its dead position at the right. Almost immediately after the arm 37 starts on this movement its contact plate 53 engages with the emergency motor circuit, whereby the emergency motor is started. The same movement of the arm 37 rocks the shaft 14 and the arm 55 and so turns the switch-wheel 54 and shifts all of the secondary leads to the switch board from the power machine to the emergency machine. In this connection it may be again explained that the rheostat B' of the emergency motor B is like the rheostat fully shown and described barring the omission of the contact strips 51 and 52 or the emergency machine itself may be replaced by an ordinary pole-changer in which case the sliding contact plate 53 and the strips 51 and 52 of the starting box would be employed for closing the circuit through the pole-changer. When the arm 37 reaches its dead position, the contact plate 36 engages with the buttons 34 and 35 and closes a circuit through the tripping magnet 25 which being energized, retracts the hook of the armature 21 from the flange 22 of the tube 12 which is thus released to the action of the spring 19 which acts to push the tube rearward and so engage the gear wheel 11 with the worm gear 10. As the wheel 11 goes into mesh with the worm 10 the flange 22 of the tube 12 engages with a contact spring 4ª and draws the same into engagement with a contact point 4ᵇ closing the circuit through the pilot motor 2 through the resistances 5, 5, leaving the pilot motor 2 in readiness to be started as soon as the current reappears in the power main.

When this happens the pilot motor 2 will be started and immediately operate through the worm 10 and gear 11 to move the arm 37 from right to left back into its running position in which it will then be held against the tension of the spring 37ª, by the release magnet 39. Just before the arm reaches its running position, the contact plate 53 carried by it will ride off the emergency motor contact strips 51 and 52 and break the current through the emergency motor which will thus be automatically cut out. When the arm 37 reaches its running position the sliding contact spring 45 engages with the terminal stud 29 and thus closes a circuit through the gear-disengaging magnet 17 which acts upon the gear wheel 11 to draw the same forward against the tension of the spring 19 until the flange 22 of the tube 12 is reëngaged and held by the hook of the armature 21, whereby the gear wheel 11 is disengaged from the worm 10, leaving the arm 37 free to be moved into its dead position by the spring 37ª the instant the main current is again interrupted. It will of course be understood that when the arm 37 is moved from right to left, the switch wheel 54 is correspondingly moved so that all of the secondary leads to the switch-board are shifted from the emergency machine back to the power machine. It thus appears that the secondary leads to the switch board are automatically shifted to the running machine whichever that may be, synchronously with the movement of the arm 37 one way or the other.

I claim:—

1. In an automatic starting box, the combination with the movable arm thereof, of means for automatically moving the said arm from its dead to its running position and for cutting the said arm-moving means out of and into operative position according to the position of the arm, and means for utilizing the arm to close a circuit through an emergency machine when the arm is not in its running position the said emergency machine then taking the place of the power machine.

2. In an automatic starting box, the combination with the movable arm thereof, of means for automatically moving the said arm from its dead to its running position and for cutting out such means when the arm reaches its running position to permit it to automatically go back to its dead position, two contact strips connected with a separate source of electrical energy, and means carried by the arm for engagement with the said strips for closing a circuit through the same when the arm leaves its running position whereby a separate source of electrical energy is brought into use until the power current again appears on the mains.

3. In an automatic starting box, the combination with the movable arm thereof, of means for automatically moving the said arm from its dead to its running position, and for cutting out such means when the arm reaches its running position to permit it to automatically go back to its dead position, and two emergency motor contact strips extending nearly throughout the sweep of the arm, and a contact plate carried by the arm and in contact with the said strips except when the arm is in its running position whereby an emergency motor connected with a separate source of electrical energy is brought into use until the power current again appears on the mains.

4. In an automatic starting box, the combination with the movable arm thereof, of self-controlled means for automatically moving the arm from its dead to its running position, means operated by the arm for closing a circuit through an emergency motor, and a switch operated synchronously with the arm for turning to the running machine, whichever it may be, the secondary leads to the switch-board.

5. In an automatic starting box, the combination with the movable arm thereof, of self-controlled means for moving the said arm from its dead to its running position and for releasing it in its running position when the power leaves the main lines, means controlled by the arm for closing the circuit through an emergency machine when the arm leaves its running position, and a wheel-switch operating synchronously with the said arm and turning the secondary leads to the switch-board to the running machine, whichever it may be, in consonance with the movement of the arm.

6. In an automatic starting box, the combination with the movable arm thereof, of self-controlled means for automatically moving the arm from its dead to its running position in which the said means are cut out of action, means controlled by the arm for cutting the emergency machine into service, a rock-shaft upon which the arm is mounted, and a wheel-switch arranged concentric with the said rock-shaft and controlled by it for shifting the secondary leads to whichever machine is running.

7. In an automatic starting box, the combination with the movable arm thereof, of self-controlled means for automatically moving the arm from its dead to its running position in which latter the said means are cut out of operation, means controlled by the arm for closing the circuit through an emergency machine when the failure of the current on the main line lets the arm leave its said running position, and a wheel-switch operating synchronously with the movable arm to shift the secondary leads to whichever machine is running, the said switch being provided with a series of radial arms each carrying a contact plate swinging between two pairs of terminal studs one pair of which goes to one machine and the other pair to the other machine.

8. In an automatic starting box, the combination with the movable arm thereof, of a rock-shaft upon which the same is mounted, a longitudinally movable tube located upon the said shaft, a gear wheel carried by the said tube, a worm gear meshing into the said gear wheel, a pilot motor for driving the said worm gear which drives the gear wheel in moving the said shaft from its dead to its running position, a gear-disengaging magnet for disengaging the gear-wheel from the worm gear, means for holding the gear-wheel in its cut out position, and a tripping magnet located in a circuit closed by the movable arm when in its dead position for releasing the said tube and permitting the said gear-wheel to engage with the said worm and thus place the pilot motor in readiness to act when the current returns to the main line.

In testimony whereof, I have signed this specification in the presence of two subscribing witnesses.

THOMAS MARION MORRIS.

Witnesses:
 FREDERIC C. EARLE,
 CLARA L. WEED.